United States Patent
Braunheim

(10) Patent No.: US 8,673,138 B2
(45) Date of Patent: Mar. 18, 2014

(54) FUEL FILTER

(75) Inventor: Michael Braunheim, Göppingen (DE)

(73) Assignee: Mahle International GmbH (DE)

( * ) Notice: Subject to any disclaimer, the term of this patent is extended or adjusted under 35 U.S.C. 154(b) by 356 days.

(21) Appl. No.: 13/059,596

(22) PCT Filed: Jul. 16, 2009

(86) PCT No.: PCT/EP2009/059154
§ 371 (c)(1),
(2), (4) Date: Feb. 17, 2011

(87) PCT Pub. No.: WO2010/020489
PCT Pub. Date: Feb. 25, 2010

(65) Prior Publication Data
US 2011/0147290 A1 Jun. 23, 2011

(30) Foreign Application Priority Data
Aug. 18, 2008 (DE) .......................... 10 2008 038 159

(51) Int. Cl.
*B01D 36/02* (2006.01)

(52) U.S. Cl.
USPC ........ 210/114; 210/171; 210/195.2; 210/196; 210/257.2; 210/262; 210/313; 210/316; 210/533

(58) Field of Classification Search
USPC ......... 210/172.1, 196, 262, 313–316, DIG. 5, 210/114, 171, 195.2, 257.2, 533; 123/514
See application file for complete search history.

(56) References Cited

U.S. PATENT DOCUMENTS

| | | | | |
|---|---|---|---|---|
| 4,618,423 A | * | 10/1986 | Hodgkins | ...................... 210/305 |
| 4,814,087 A | * | 3/1989 | Taylor | .......................... 210/641 |
| 7,473,353 B2 | | 1/2009 | Giolitti et al. | |
| 2006/0118478 A1 | | 6/2006 | Linhart et al. | |
| 2007/0114160 A1 | | 5/2007 | Giolitti et al. | |
| 2010/0101984 A1 | | 4/2010 | Roesgen et al. | |

FOREIGN PATENT DOCUMENTS

| | | |
|---|---|---|
| DE | 3631846 A1 | 4/1987 |
| DE | 4409570 A1 | 5/1995 |
| DE | 10138695 A1 | 2/2003 |
| DE | 102004042245 A1 | 3/2006 |
| DE | 102004059062 A1 | 6/2006 |
| DE | 102007039661 A1 | 3/2008 |
| DE | 202006019301 U1 | 4/2008 |
| EP | 1144074 A1 | 10/2001 |
| GB | 2241443 A | 9/1991 |
| JP | 1-138364 | 5/1989 |
| JP | 2008-511784 A | 4/2008 |
| WO | WO-2008/023029 A2 | 2/2008 |

OTHER PUBLICATIONS

English abstract for DE-3631846.

(Continued)

*Primary Examiner* — Matthew O Savage
(74) *Attorney, Agent, or Firm* — Rader, Fishman & Grauer PLLC

(57) ABSTRACT

A fuel filter includes a filter element disposed in a filter housing. The filter element is penetrated by fuel flowing in a radial direction from a raw end to a pure end. The fuel filter has a first water separator and a smooth-flow second water separator disposed in series with and connected to the first water separator. Fuel is discharged from the second water separator by a pressure difference generated in the fuel filter.

17 Claims, 2 Drawing Sheets

(56) References Cited

OTHER PUBLICATIONS

English abstract for DE-4409570.
English abstract for DE-10138695.
English abstract fro DE-102007039661.
English language abstract for JP 1-138364, May 1989.
Office Action dated Aug. 27, 2013 of the corresponding JP Patent Application No. 2011-523369.
English translation of the Office Action dated Aug. 27, 2013 of the corresponding JP Patent Application No. 2011-523369.

* cited by examiner

FUEL FILTER

CROSS-REFERENCES TO RELATED APPLICATION

This application claims priority to German patent application DE 10 2008 038 159.4 filed on Aug. 18, 2008, and PCT application PCT/EP2009/059154 filed on Jul. 16, 2009, which are hereby incorporated by reference in their entirety.

TECHNICAL FIELD

The present invention relates to a fuel filter for an internal combustion engine of a motor vehicle. Moreover, the invention relates to an internal combustion engine of a motor vehicle equipped with such a fuel filter.

BACKGROUND

Today, fuel filters can be found in any motor vehicle and serve for filtering out different kinds of contaminations such as, for example, solid particles, water, etc. from the fuel to be combusted before entering an internal combustion engine. Particular attention is recently being paid to filtering out water from the fuel to be combusted because water portions in the fuel can result in corrosion and an impairment of the engine performance and because the water content in particular in modern biofuels such as, for example, biodiesel, is significantly higher than in known fossil fuels. The reason for the high water content in biofuels is in particular that the latter are highly hygroscopic. For this reason it is known to combine fuel filters with so-called water separators in order to achieve in this manner that the internal combustion engine is supplied with fuel that is as pure as possible. The separated water is collected in suitable water collection chambers of the water separator and is periodically discharged or discharged as needed. In addition, an activated carbon filter can be integrated in a discharge line of the water separator, which activated carbon filter absorbs the carbon portions still remaining in the water to be discharged and thus prevents that the same escape unintentionally into the environment.

SUMMARY

The invention is concerned with the problem to improve a fuel filter of the aforementioned type in such a manner that a particularly high degree of water separation can be achieved.

This problem is solved according to the invention by the subject matters of the independent claims. Advantageous developments are subject matter of the dependent claims.

The invention is based on the general idea to implement, in contrast to previous fuel filters with an associated water separator, a two-stage water separation concept by providing a second water separator which is arranged connected in series to the first water separator of the fuel filter and is formed in a smooth-flow manner, whereby preferably a purely laminar flow of a fuel-water mixture in the second water separator and thus a particularly high degree of water separation can be achieved. For this, the fuel filter according to the invention usually comprises filter element which is arranged in a filter housing and through which a flow penetrates in the radial direction from a raw end to a pure end and the aforementioned first water separator for separating the water contained in the fuel. According to the invention, a second water separator is now connected in series to the first water separator and is formed in such a manner that the fuel-water mixture flowing through the second water separator does not have a turbulent, but only a laminar flow and thus the water still contained in the fuel can be sedimented and separated in a particularly good manner. However, preferably, not the whole amount of fuel is supplied to the second water separator, but only the water separated at the first water separator together with a fuel phase.

The flow through the first as well as the second water separator preferably takes place in a continuous manner, namely due to a pressure difference generated within the fuel system itself, for example, by connecting a fuel discharge line from the second water separator to a return line running to the fuel tank or to an inlet line of the fuel filter. The discharge volume from the second water separator is set here in such a manner that the transport of the water separated at the first water separator can be carried out with a fuel phase and that the laminar flow in the second water separator can be ensured. By means of the fuel filter according to the invention, the water content contained in the fuel can be separated from the fuel in a particularly good manner and to a particularly high degree, whereby, on the one hand, the corrosion tendency in the downstream internal combustion engine is reduced and, on the other, the combustion performance of the fuel to be combusted can be increased due the filtered out water content. Another advantage of the fuel filter according to the invention having two water separators connected in series is that, in comparison to an embodiment having only one water separator, the water to be discharged from the second water separator has a significantly reduced fuel content so that a filter element filtering out said fuel content, for example, an activated carbon filter, on the one hand, can be designed smaller or, on the other, has to be maintained or replaced considerably less frequently. Moreover, with such a fuel filter, an emission rate of the fuel content unintentionally discharged together with the water to be discharged into the environment via the water separator can also be reduced which is advantageous in particular with respect to the increasingly strict environmental constraints.

In an advantageous development of the solution according to the invention, the amount of discharged fuel from the second water separator is much smaller than the fuel flow through the fuel filter and the first water separator. A flow which is lower by the factor 1/20 to 1/200 provides then the condition that an exclusively laminar flow can be implemented in the second water separator, which laminar flow has no turbulences and thus allows a particularly good separation of the water from the fuel. In principle, it is also possible to limit the amount of discharged fuel from the second water separator, for example, to several liters per hour. Such a limitation can guarantee that in the second water separator an exclusively laminar flow is present which has no turbulences and thus allows a particularly high separation rate of water.

In an advantageous development of the solution according to the invention, a valve device comprising at least two redundant, controllable valves connected in series is provided at a water drain of the second water separator so that draining water from the second water separator is only possible if both valves are being opened or are open. Due to the two valves connected in series it thus can be ensured that there is no risk of unintended draining of water, in particular in the event if one of the two valves, for example, is defective. In order to intentionally drain the water, both valves have to be opened so that unintended draining of water can be reliably prevented. For this, the valves are preferably formed in such a manner that in the non-controlled state and in a defective state, the valves are pre-tensioned in their closed position, for example via a spring device, and thus prevent water from unintentionally escaping from the water separator.

In a further advantageous embodiment of the solution according to the invention, an adsorption filter for hydrocarbons, in particular an activated carbon-type filter, is provided in the region of the water drain of the second water separator. Activated carbon is an extremely fine-grained carbon with an extremely large inner surface and which, due to said large inner surface, is used as adsorbent, in particular for hydrocarbons. The inner surface of activated carbon is between 300 and 2000 $m^2/g$, whereby a high adsorption volume of hydrocarbons can be achieved.

Further important features and advantages of the invention arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the context of the present invention.

Preferred exemplary embodiments of the invention are illustrated in the drawings and are explained in the following description in more detail, wherein identical reference numbers refer to identical, or similar, or functionally identical components.

DETAILED DESCRIPTION

Figure 1:
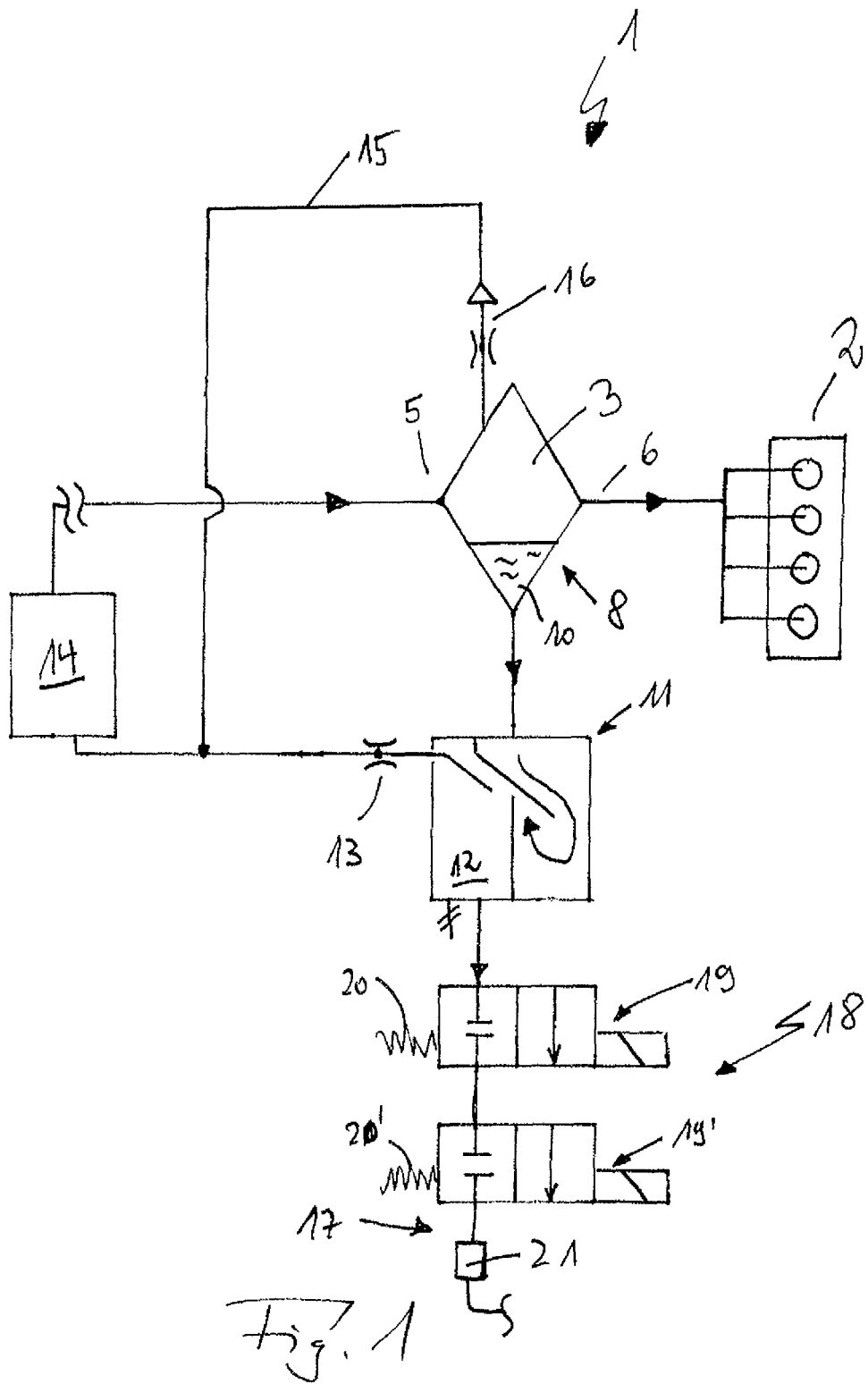
FIG. 1 shows a possible embodiment of a fuel supply system of an internal combustion engine comprising a fuel filter according to the invention.

According to FIG. 1, a fuel supply system 1 for an internal combustion engine 2 comprises a fuel filter 3 by means of which contaminations, for example solid particles and water portions, are separated from a fuel to be supplied to the internal combustion engine 2 for combustion. The flow direction of the fuel in the fuel supply system 1 is symbolized by corresponding arrows at the fuel lines.

Figure 2:
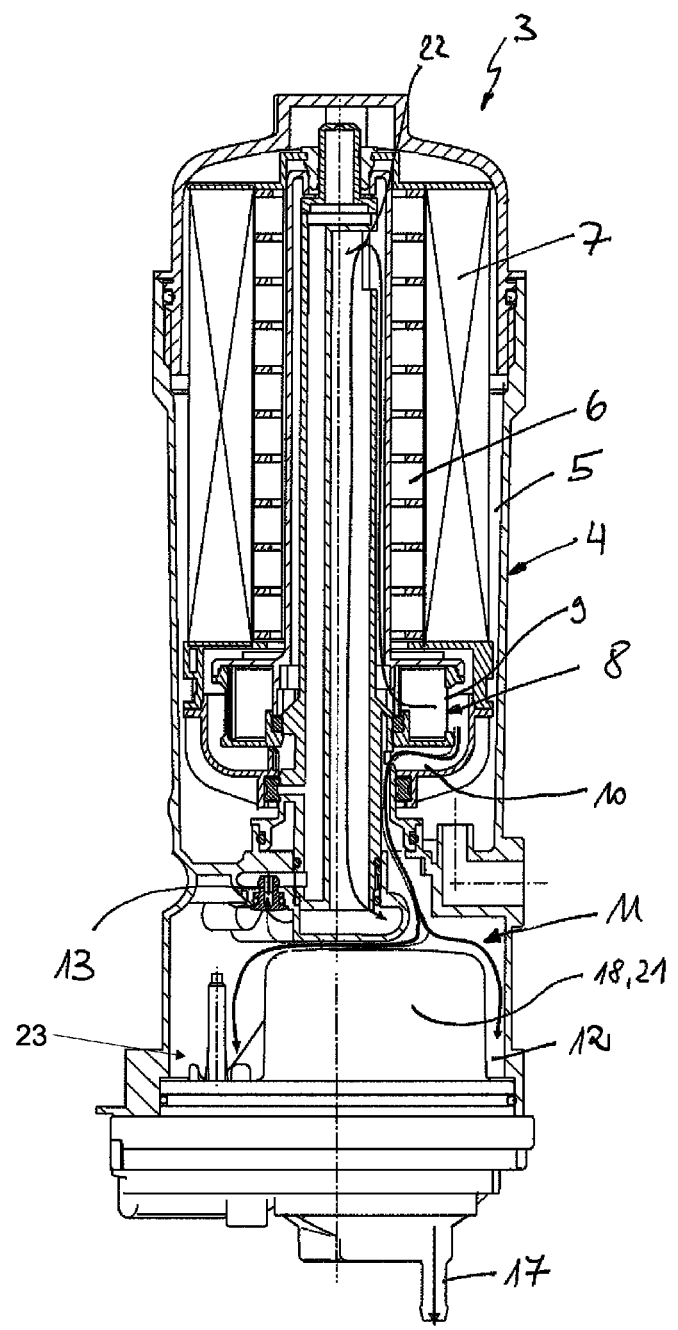
FIG. 2 shows a sectional view through a possible embodiment of a fuel filter according to the invention.

In a conventional manner, which is also illustrated according to FIG. 2, the fuel filter 3 comprises a filter element 7 which is arranged in a filter housing 4 and which is penetrated by a flow in the radial direction from a raw end 5 to a pure end 6. Furthermore, the fuel filter 3 comprises a first water separator 8 which, in the embodiment of the fuel filter 3 shown in FIG. 2, is arranged below the filter element 5 which is arranged vertically and is formed as annular filter.

The first water separator 8 can comprise, for example, an annular, hydrophobic diaphragm 9 which is arranged in a similar manner as the annular filter element 7, that is, in particular vertically, and which is permeable for fuel but is impermeable for water. Hereby, the water content present in the fuel is coalesced or collected at the diaphragm 9 and upon reaching a certain drop size, is discharged downwards into a first water collection chamber 10. According to the invention, the fuel filter 3 comprises a second water separator 11 which is connected in series to the first water separator 8 and is formed in a smooth-flow manner and which is arranged below the first water separator 8. Smooth-flow means in this case that the fuel-water mixture flowing through the second water separator 11 flows laminarly, that is, without turbulences and thus allows a particularly good sedimentation of the residual water. The water sedimented, that is, separated in the second water separator 11 is collected in a second water collection chamber 12 and is drained as needed.

Discharging fuel from the second water separator 11 takes place by means of a pressure difference present or generated in the fuel supply system 1. For example, fuel in the fuel supply system 1, which, for example, is pressurized, can be discharged via a throttle device 13 into a pressureless return line running to a fuel tank 14 (cf. FIG. 1). Additionally or alternatively to this, discharging fuel from the second water separator 11 can take place via a venturi nozzle ejector pump (not illustrated) arranged in an inlet line of the fuel filter 3. It is important that the flow in the second water separator 11 remains laminar. This is in particular the case if an amount of discharged fuel from the second water separator 11 is much smaller than the flow through the fuel filter 3 and the first water separator 8. Depending on the size and flow through the fuel filter 3, a flow through the water separator 11 which is lower by the factor 1/20 to 1/200 provides good conditions for a laminar flow.

As illustrated in the FIGS. 1 and 2, the first as well as the second water separator 8, 11 are connected at the pure end 6 of the fuel filter 3, wherein it is principally also conceivable that the two water separators 8 and 11 are provided at the raw end 5 of the fuel filter 3.

In order to be able to reliably maintain the function of the two water separators 8 and 11, preferably, at least one water sensor 23 is provided in the second water separator 11, which sensor 23 detects and continuously checks a water level in the second water collection chamber 12 and, if necessary, generates a signal for draining water from the second water collection chamber 12. For draining the water collected in the second water collection chamber 12, a valve device 18 comprising at least two redundant, controllable valves 19 and 19' connected in series is provided at a water drain 17 of the second water separator 11 so that draining of water can only take place if both valves 19 and 19' are open. For example, if one of the two valves 19, 19' is defective and thus cannot be controlled, it is still possible to reliably prevent that water can escape unintentionally from the second water separator 11 into the environment. Moreover, the two valves 19 and 19' are preferably each equipped by means of spring devices 20 and 20' which pre-tension the valves 19 and 19' in their closing direction, in particular in the currentless state.

In the region of the water drain 17, in the flow direction either upstream or downstream of the valve device 18, an adsorption filter 21 for hydrocarbons can be provided, which filter is formed in particular as activated carbon filter. Such an adsorption filter collects the hydrocarbons still contained in the water to be drained and prevents the hydrocarbons from escaping into the environment so that during a necessary draining of water, exclusively water and no additional fuel is discharged into the environment.

The smooth-flow formation of the second water separator 11 can be generated, for example, by constructional configurations such as, for example, guide and/or baffle elements. Moreover, it is conceivable that filter element 7 and/or the first water separator 8 and/or the second water separator 11 are formed as separate components or as single combination component. When formed as separate components, a separate and individual replacement of the individual components is possible, whereas when formed as combination component, in each case at least two interconnected components have to be replaced together.

As illustrated in FIG. 2, the discharge of the cleaned fuel is carried out via a center tube 22, whereby the fuel filter 3 can be designed in a conventional manner as top filter.

With the fuel filter 3 according to the invention, comprising two water separators 8 and 11 connected to each other in series, a particularly high water separation rate can be achieved, whereby, on the one hand, the corrosion risk for the internal combustion engine 2 can be reduced and, on the other, the performance of the internal combustion engine 2 can be increased. Due to the fact that the discharged fuel from the second water separator 11 runs into the fuel tank 14 or to the raw end 5 of the fuel filter 3, moreover, it can be reliably excluded that dirt particles which, for example, get into the first water collection chamber 10 when replacing the filter element 7, can subsequently reach the internal combustion engine 2 in an unfiltered manner and thus damage the same.

Feeding the amount of discharged fuel into the return line to the fuel tank 14 prevents in addition that, for the case that the second water collection chamber 12 is completely filled with water, but, temporarily, no water is being drained, the water collection chamber 10 of the first water separator 8 fills with water and during a further inflow of water, a water break-through through the diaphragm 9 takes place and causes damage to the internal combustion engine 2, because after filling the second water collection chamber 12, further water together with the amount of discharged fuel is recirculated to the fuel tank 14. In the fuel tank 14, the large amount of fuel buffers said water for a limited period of time. This period of time is additionally available for carrying out the drainage of water.

The invention claimed is:

1. A fuel filter comprising:
   a filter housing having a first inlet for receiving a first flow of fuel contaminated with water, a first outlet for filtered fuel, a second outlet for filtered fuel, and a water outlet;
   a filter element disposed in the filter housing and configured to be penetrated by the first flow in a radial direction from a raw side to a pure side;
   a hydrophobic diaphragm having an inlet side fluidly communicating with the pure side of the filter element and an outlet side fluidly communicating with the first outlet for filtered fuel, wherein the diaphragm retains water on the inlet side and permits fuel to flow from the inlet side to the outlet side and to the first outlet, and wherein the diaphragm fluidly separates the first outlet for filtered fuel from the second outlet for filtered fuel;
   a smooth-flow water separator fluidly connected in series with the inlet side of the diaphragm so as to receive a second flow of fuel contaminated with water from the inlet side of the diaphragm, wherein the water separator separates the fuel from the water in the second flow and directs the separated fuel to the second outlet for filtered fuel and the separated water to the water outlet; and
   wherein fuel is discharged from the water separator by a pressure difference generated in the fuel filter.

2. The fuel filter according to claim 1,
   further comprising a throttle device disposed in the second outlet for filtered fuel.

3. The fuel filter according to claim 2, wherein the fuel filter is configured such that a flow of discharged fuel from the water separator is lower by a factor of approximately 1/20 to 1/200 than the flow the inlet flow.

4. The fuel filter according to claim 3, further comprising at least one water sensor disposed in the second water separator and configured to detect a water level.

5. The fuel filter according to claim 4, wherein the filter housing is generally cylindrical and the diaphragm and the second water separator are disposed in the filter housing below the filter element of the fuel filter.

6. The fuel filter according to claim 5, further comprising a valve device having at least two redundant and controllable valves connected in series at a water drain of the second water separator, the valve device being configured to drain water when both valves are open.

7. The fuel filter according to claim 6, wherein an absorption filter is disposed in the water drain of the second water separator, the absorption filter being an activated carbon filter.

8. The fuel filter according to claim 7, wherein the second water separator is configured such that at least within the second water separator the flow of the third fluid flow is substantially laminar.

9. The fuel filter according to claim 1,
   wherein the fuel filter is configured such that a flow of discharged fuel from the water separator is lower by a factor of approximately 1/20 to 1/200 than the flow of the inlet flow.

10. The fuel filter according to claim 1,
    further comprising at least one water sensor disposed in the second water separator and configured to detect a water level.

11. The fuel filter according to claim 1,
    wherein the filter housing is generally cylindrical and the diaphragm and the second water separator are disposed in the filter housing below the filter element of the fuel filter.

12. The fuel filter according to claim 1,
    further comprising a valve device having at least two redundant and controllable valves connected in series at a water drain of the second water separator, the valve device being configured to drain water when both valves are open.

13. The fuel filter according to claim 12,
    further comprising an absorption filter disposed in the water drain of the second water separator, the absorption filter being an activated carbon filter.

14. The fuel filter according to claim 1,
    wherein the second water separator is configured such that at least within the second water separator the flow of the third fluid flow is substantially laminar.

15. The fuel filter according to claim 1,
    wherein the fuel discharge from the second water separator is continuous.

16. The fuel filter according to claim 1,
    wherein any combination of the filter element and the first water separator and the second water separator are formed as a single combination component.

17. A fuel supply system for an internal combustion engine comprising the fuel filter of claim 1.

* * * * *